UNITED STATES PATENT OFFICE.

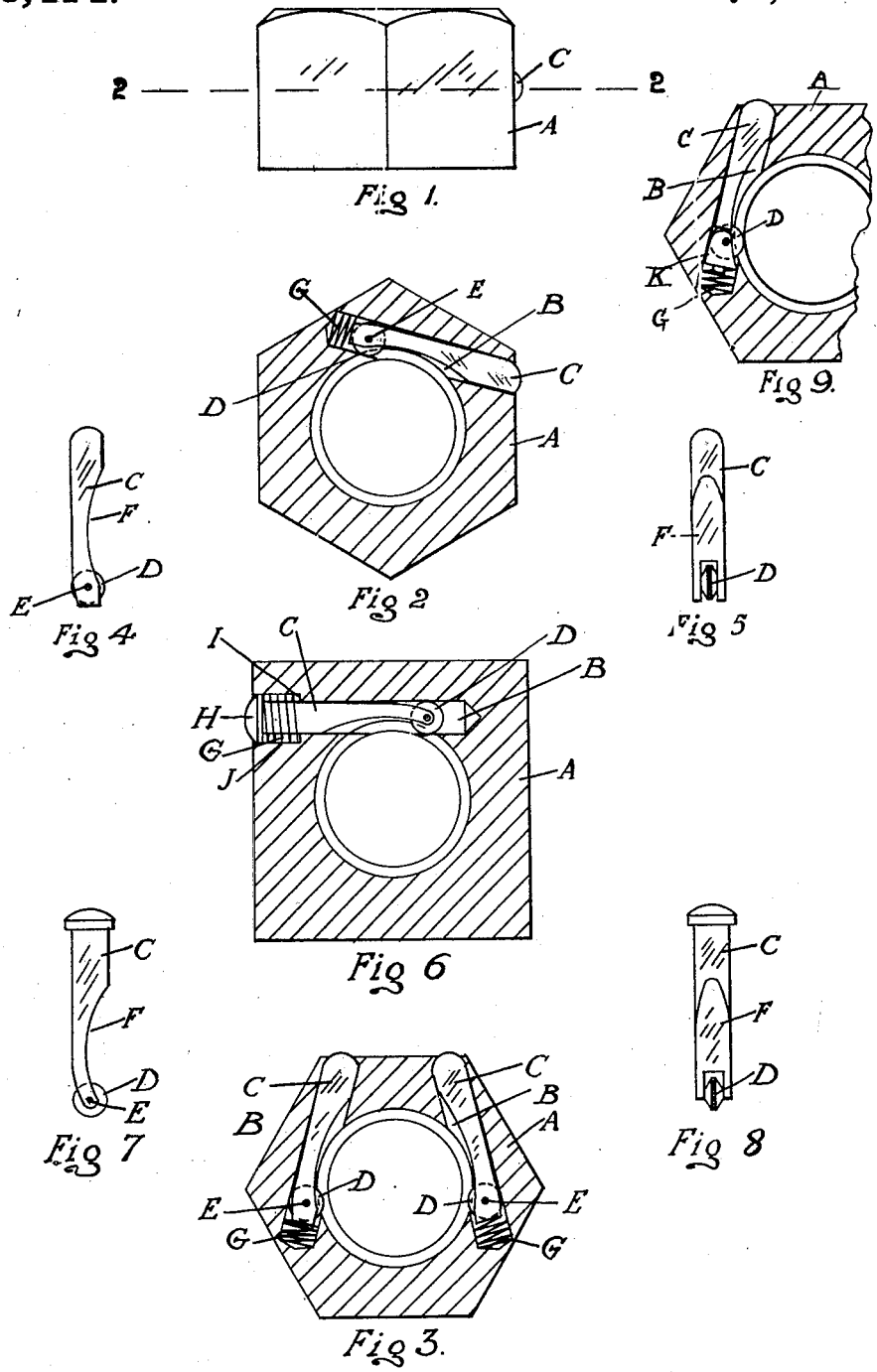

WALTER HENRY MANSELL, OF GRAYS, ENGLAND.

NUT-LOCK AND THE LIKE.

1,383,414.   Specification of Letters Patent.   Patented July 5, 1921.

Application filed August 7, 1920. Serial No. 401,852.

*To all whom it may concern:*

Be it known that I, WALTER HENRY MANSELL, a subject of the King of Great Britain, residing at "Lyncroft," New Road, Grays, in the county of Essex, England, have invented new and useful Improvements in Nut-Locks and the like, of which the following is a specification.

My invention relates to a locking device for nuts and other articles in which the parts are adjusted or united by screw threads, and in which it is desirable that no movements of the parts shall take place after they are adjusted or screwed up, until it is necessary to re-adjust or separate them.

The objects of my invention are, to enable the locking mechanism to adjust itself to inequalities in the threads of the male screw; to reduce the number of parts in the locking mechanism to a minimum; and to cause the placing of a spanner on a nut or other article in order to unscrew it, to automatically actuate the unlocking mechanism.

These objects I attain by the mechanism illustrated by the accompanying drawings in which:—

Figure 1 is an elevation of a nut provided with locking mechanism constructed according to this invention.

Fig. 2 is a section of the same on line 2 2 Fig. 1.

Fig. 3 is a similar section of a nut provided with two locking devices.

Fig. 4 is a side elevation of the unlocking plunger and locking disk.

Fig. 5 is a front elevation of the same.

Fig. 6 is a sectional plan of a left hand thread nut provided with locking mechanism constructed according to this invention.

Fig. 7 is a side elevation of the unlocking plunger.

Fig. 8 is a front elevation of the same.

Fig. 9 shows a modified form of my invention.

Referring to Figs. 1 to 5, A is an ordinary hexagon nut having an internal right hand thread therein to fit a right hand thread bolt.

B is a channel which is drilled, or otherwise formed, partly through the nut A, at a tangent to and intersecting the threaded portion thereof, the channel B being preferably located midway of the depth of the nut A.

Moving freely in the channel B is a plunger C, the outer end of which projects beyond the face of the nut as shown by Fig. 1, the inner end of the plunger carrying the locking disk D.

The disk D is milled or knurled to insure a good grip on the threads of the bolt and is shaped to fit the threads of the same, the disk being shown beveled on the periphery to fit a V threaded bolt.

The disk is mounted loosely on the pin E so as to insure the said disk bearing on the outer wall of the channel B as well as on the bolt, and also to enable the disk to accommodate itself to any inequalities in the threads of the bolt.

The plunger C is flattened and curved at F to allow it to clear the bolt.

G is a helical spring which is placed at the bottom of the channel B and bears at one end against the inner end of the plunger C, and against the bottom of the channel B at the other end.

The outer end of the plunger C is preferably domed to enable the spanner used to screw up and unscrew the nut to slide easily over the end of the plunger and force the plunger inward in order to release the locking disk D from the threads of the bolt.

The plunger C is prevented from becoming detached from, or turning in, the nut A by closing the metal surrounding the edge of the channel B partly over the end of the plunger, or the plunger may be retained in the nut by a screw, pin, or other suitable means.

Referring to Figs. 6, 7 and 8, the nut illustrated by Fig. 6 has a left hand thread, and the channel B is drilled from left to right, instead from right to left, when looking at the nut from the top.

It will be seen that in the case of square nuts, the channel B may be formed parallel to the face of the nut, instead of at an angle therewith.

The plunger C also has a head H at the outer end thereof, and the spring G encircles the plunger and bears at its outer end on the inside of the head H of the plunger C, and at its inner end on the shoulder I formed by the enlargement of the channel B which is enlarged at J to receive the head H of the plunger C and the spring G.

As shown by the drawings, the normal position of the disk D is such that as the plunger C moves inward the said disk recedes from the center of the nut, and approaches the center of the nut when the plunger moves outward.

In cases where a fine adjustment is required and any forward movement of the nut when adjusted must be prevented, valve spindle nuts for example, I may use two locking disks and plungers, one right hand and the other left hand as shown by Fig. 3, in order to prevent any possible movement of the nut when once adjusted.

According to the modified form of my invention shown by Fig. 9, the disk D is held in a fork K, the said fork being supported by the spring G at the bottom of the channel B, the plunger C being recessed to admit a portion of the disk D in order to prevent the fork K from twisting in the channel B when the nut has been removed from the bolt.

Any of the locking devices hereinbefore described may be applied to either right or left hand nuts and other articles.

When the nut has to be screwed up, the spanner used for rotating the nut pushes the plunger C inward and automatically relaxes the grip of the disk D on the threads of the bolt, thus allowing the nut to rotate freely in the required direction.

The nut may also be screwed on the bolt by the fingers, as the locking mechanism allows the nut to be rotated in a forward direction, except in the case of nuts with two locking devices, without pushing the plunger inward.

When the nut is screwed up and the spanner removed, the locking disk D resumes its normal position and the spring G causes it to become jammed between the threads of the bolt and the outer wall of the channel B, and prevents any rotation, or tendency to rotation, in the opposite direction, as any rotation in the unscrewing direction would move the locking disk into a diminishing space and increase the grip on the bolt.

When a spanner is placed on the nut and the plunger moved inward thereby, the spanner holds the plunger C in such a position that the disk D does not grip the bolt, and the nut may be unscrewed as easily as an ordinary nut.

If the nut is provided with two locking devices, it will be necessary to push both plungers inward for screwing up and for unscrewing.

Although I have described my invention as applied to locking nuts, my invention may be applied to other purposes where screw threads are employed, screwed on covers for acetylene generators and securing wheels on axles, for example and where it is necessary to prevent the screwed parts from becoming loose.

I claim:—

A locking device for nuts, comprising, in combination, a nut provided with a channel at a tangent to and intersecting the threaded portion of the nut, a plunger slidable in said channel in contact with the wall thereof, said plunger being bifurcated at its inner end, a locking disk mounted for rotation between the bifurcations of said plunger, a helical spring in engagement with the inner end of the plunger for normally retaining said disk in locking position, the outer end of the channel being upset into direct engagement with a portion of the plunger thereby to limit the movement of the plunger under the action of the spring, and the outer end of the plunger projecting beyond the end of the channel whereby the depression of the spring and releasing the locking disk may be accomplished from the exterior of the nut.

WALTER HENRY MANSELL.